April 11, 1967  N. R. HALLENIUS  3,313,433
MACHINE FOR UNLOADING ROWS OF PILES OF ARTICLES
STANDING ON A PALLET Filed July 6, 1965  2 Sheets-Sheet 1

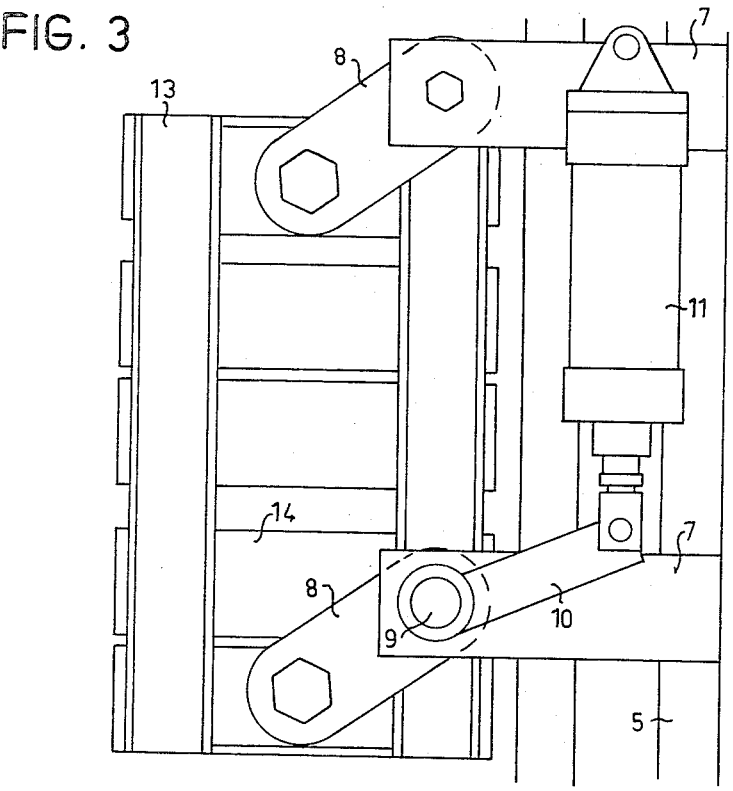
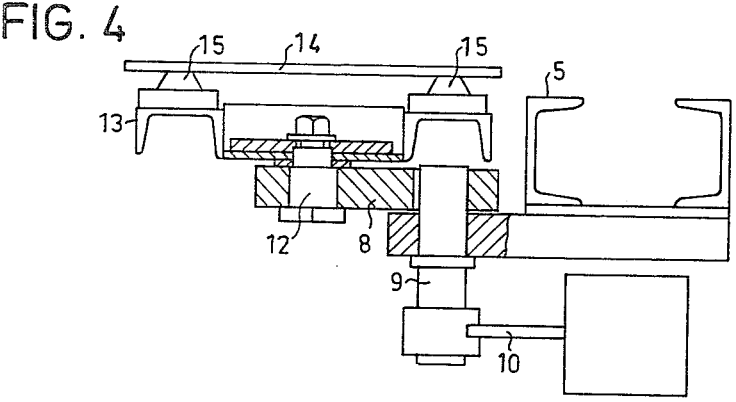

United States Patent Office 3,313,433
Patented Apr. 11, 1967

3,313,433
MACHINE FOR UNLOADING ROWS OF PILES OF ARTICLES STANDING ON A PALLET
Nils Ragnar Hallenius, Erik Dahlbergsgatan 17, Goteborg, Sweden
Filed July 6, 1965, Ser. No. 469,482
2 Claims. (Cl. 214—309)

This invention relates to a machine for unloading rows of piles of articles, such as boxes or crates, preferably standing on a load pallet. Putting down each individual box manually is time-consuming and hard work. In view of the conveying capacity of modern conveyors rapid emptying of the pallet and separation of the piles is necessary, and for this reason mechanical handling of the articles is the only rational way of solving this problem. The object of this invention is to provide a machine for transferring, from an advanced set of articles consisting of rows of piled boxes, crates or the like, each individual row to a conveyor or the like for further transportation to another machine in which ther ows are separated into individual boxes.

The invention is characterized in that a carriage is movable to and fro on a track extending in the direction of movement of the piles, that the carriage is provided with an upright on each side of the rows of piles which uprights are movable on the carriage at right angles to the direction of movement of the carriage, and that each upright is provided with a gripping and lifting member by means of which the rows of piles can be lifted one at a time from the track or pallet and, upon displacement of the carriage, transferred to a conveyor or the like the direction of movement of which makes an angle with the track of the carriage.

Figure 1:
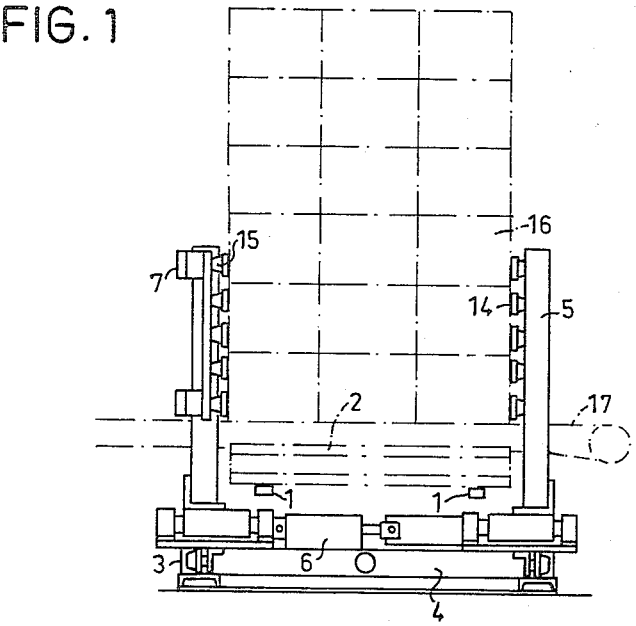
Figure 2:
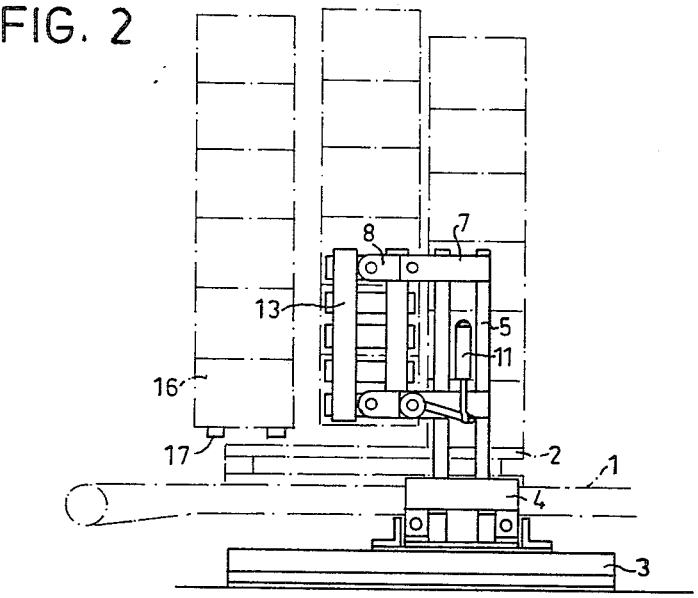

The invention is described more closely with reference to the annexed drawings in which FIG. 1 is an end view of the machine, FIG. 2 is a lateral view of the machine according to FIG. 1, FIG. 3 is an enlarged detailed view of a gripping and lifting member, and FIG. 4 is a partly sectional top view of the member shown in FIG. 3.

Load pallets 2 carrying one or a plurality of rows of piled articles, such as boxes, crates or the like, can be advanced on a conveyor 1, such as a chain or belt conveyor. By means of a pneumatically operated device (not shown) a carriage 4 is movable to and fro on a track 3 provided below the conveyor 1 and extending in the longitudinal direction of the conveyor. On each side of the carriage 4 there is provided an upright 5. The two uprights are mounted such that they can be displaced toward and away from each other at right angles to the track 3 by means of a pneumatically operated piston and cylinder device 6. The distance between the uprights is such that a load pallet carrying piled articles can be advanced between the uprights.

Secured to the uprights 5 are brackets 7 extending one above another longitudinally of the carriage 4. Each bracket is articulated to a link 8 by means of a pivot 9. One of the pivots, preferably the lower one, is non-rotatably connected to an arm 10 which can be swung by means of a pneumatically operated piston movable in a cylinder 11. The free ends of the links 8 carry a pivot 12 on which a frame 13 is mounted for swinging movement. Upon swinging movement of the arm 10 the frame 13 will be swung parallel to itself about the pivots 9.

Mounted on the frame 13 are clamping plates 14 arranged in parallel relation one above another and secured to the frame 13 by means of resilient elements, such as buffers 15 of rubber or the like. The height of the clamping plates 14 and the distance between them are adapted such that at least two plates can be forced against one box of the pile.

The mode of operation of the machine will appear from the following description.

A load pallet 2 carrying one or a plurality of rows of boxes 16 or the like is advanced on the conveyor 1 between the uprights 5 and is stopped in a position in which the foremost row of boxes 16 registers with the clamping plates 14. In this position the frame 13 assumes its lowermost position. Thereupon air under pressure is admitted to the piston and cylinder device 6 with the result that the clamping plates 14 are forced against each side of the row of boxes. Due to their resiliency the clamping plates will firmly grip all of the boxes located between the frames even if these boxes are of different widths. Thereupon the frames 13 are swung upward by means of the pneumatic cylinder 11 resulting in that the row of boxes will be swung forward and upward and separated from the rows of boxes remaining on the load pallet. Then the carriage 4 together with the lifted row of boxes is moved forward to a transversely directed conveyor 17 onto which the row of boxes is put down. After the clamping plates 14 have been released the carriage 4 returns and fetches a following row of piles in the manner described while the first row of boxes is conveyed to a pile separating machine or the like. The empty load pallet 2 is advanced below the conveyor 17 into the magazine. In order to keep the travel of the carriage 4 constant, the load pallet 2 together with the remaining rows of boxes can be stepwise displaced such that the row to be gripped always assumes the same position.

While in the machine described the articles to be conveyed are standing on a load pallet they may instead be carried directly by the conveyor. In this case the mode of operation for advancing the rows is the same as described above.

What I claim is:

1. A machine for handling rows of piles of articles comprising a first substantially horizontal, longitudinally extending conveyor adapted to carry said rows of piles of said articles, a second substantially horizontal, longitudinally extending conveyor at an angle to said first conveyor and adapted to receive a row of piles of articles transferred thereto from said first conveyor, a carriage below said first conveyor and movable in the longitudinal direction thereof, means supported on said carriage for gripping a row of piles of articles on said first conveyor and depositing said row of piles of articles on said second conveyor, said gripping means comprising an upright on each side of said carriage adjacent to an edge of said first conveyor, said uprights being movable toward and away from each other, means for moving said uprights toward and away from each other, an article clamping plate pivotally connected to each upright, each article clamping plate being movable forwardly and upwardly relative to the upright to which it is pivoted, and means for simultaneously moving said clamping plates forwardly and upwardly.

2. A machine as defined in claim 1, comprising a frame pivotally connected to each upright by parallel links and buffers connecting each frame to said clamping plates.

References Cited by the Examiner
UNITED STATES PATENTS

| 1,319,872 | 10/1919 | Jones et al. | |
| 1,904,720 | 4/1933 | Douglass | 214—309 |
| 2,799,414 | 7/1957 | Streckfuss | 214—309 |
| 2,890,807 | 6/1959 | Parcell | 214—653 |
| 3,221,910 | 12/1965 | Izumi | 214—309 |
| 3,241,695 | 3/1966 | Bishop | 214—653 |

HUGO O. SCHULZ, *Primary Examiner.*